(12) United States Patent
Reibold et al.

(10) Patent No.: US 9,080,617 B2
(45) Date of Patent: Jul. 14, 2015

(54) METHOD FOR CONTROLLING A FRICTION CLUTCH

(71) Applicant: Schaeffler Technologies AG & Co. KG, Herzogenaurach (DE)

(72) Inventors: Ekkehard Reibold, Lahr (DE); Georg Goeppert, Hausach (DE); Loyal George MacMillian, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 80 days.

(21) Appl. No.: 14/021,186

(22) Filed: Sep. 9, 2013

(65) Prior Publication Data
US 2014/0005000 A1 Jan. 2, 2014

Related U.S. Application Data

(63) Continuation of application No. PCT/DE2012/000137, filed on Feb. 16, 2012.

(30) Foreign Application Priority Data

Mar. 14, 2011 (DE) .......................... 10 2011 013 939
Mar. 31, 2011 (DE) .......................... 10 2011 015 639

(51) Int. Cl.
G06F 7/00 (2006.01)
F16D 48/00 (2006.01)
F16D 48/06 (2006.01)
F16H 61/00 (2006.01)
F16H 61/04 (2006.01)

(52) U.S. Cl.
CPC ................ *F16D 48/00* (2013.01); *F16D 48/06* (2013.01); *F16D 2500/30405* (2013.01); *F16D 2500/50236* (2013.01); *F16D 2500/5116* (2013.01); *F16D 2500/5118* (2013.01);
(Continued)

(58) Field of Classification Search
CPC .......... B60W 10/02; B60W 2030/203; B60W 2050/0014; B60W 2050/0026; B60W 2050/004; B60W 2510/0208; B60W 2510/0225; B60W 2510/0258; B60W 2510/0275; B60W 2510/0291; B60W 2710/02; B60W 2710/021; B60W 2710/022; B60W 2710/023; B60W 2710/029; B60W 2710/025; F16H 2061/0087; F16H 2061/009; F16H 2061/0093; F16H 2061/0096; F16H 2061/0407; F16H 2061/0459; F16D 48/06; F16D 48/00; F16D 2500/30405; F16D 2500/5118; F16D 2500/5116; F16D 2500/50236; F16D 2500/50245; F16D 2500/50251; F16D 2500/50275
See application file for complete search history.

(56) References Cited

U.S. PATENT DOCUMENTS

2004/0064232 A1* 4/2004 Eich et al. .................... 701/68
2006/0122031 A1* 6/2006 Preisner et al. ............... 477/80
(Continued)

FOREIGN PATENT DOCUMENTS

DE 10355253 A1 6/2004
DE 102008021686 A1 11/2009
DE 102010024940 A1 1/2011

*Primary Examiner* — David D Le
(74) *Attorney, Agent, or Firm* — Simpson & Simpson, PLLC

(57) ABSTRACT

A method for controlling a friction clutch in a drive train of a motor vehicle, using a clutch actuator, on the basis of a clutch model. A nominal characteristic curve of the clutch moment, which is transmitted via the friction clutch, is adapted continuously to actual operating parameters. In order to counteract a loss of comfort of the motor vehicle, which is caused by the running-in behavior, for example, of the friction linings of the friction clutch, the friction clutch is operated by way of different sets of operating parameters during a running-in phase of the friction clutch, and after the run-in phase of the friction clutch.

12 Claims, 1 Drawing Sheet

(52) U.S. Cl.
CPC .................. *F16H 2061/0087* (2013.01); *F16H 2061/0096* (2013.01); *F16H 2061/0459* (2013.01); *Y10T 477/75* (2015.01)

(56) References Cited

U.S. PATENT DOCUMENTS

| | | | |
|---|---|---|---|
| 2008/0277224 A1 | 11/2008 | Kiessner-Haiden | |
| 2009/0000901 A1* | 1/2009 | Reibold | 192/70.252 |
| 2009/0011899 A1* | 1/2009 | Reuschel | 477/5 |
| 2010/0113218 A1 | 5/2010 | Herter | |
| 2010/0114443 A1* | 5/2010 | Terwart et al. | 701/68 |
| 2012/0109473 A1* | 5/2012 | Hodrus et al. | 701/51 |
| 2013/0253791 A1* | 9/2013 | Hodrus et al. | 701/67 |

* cited by examiner

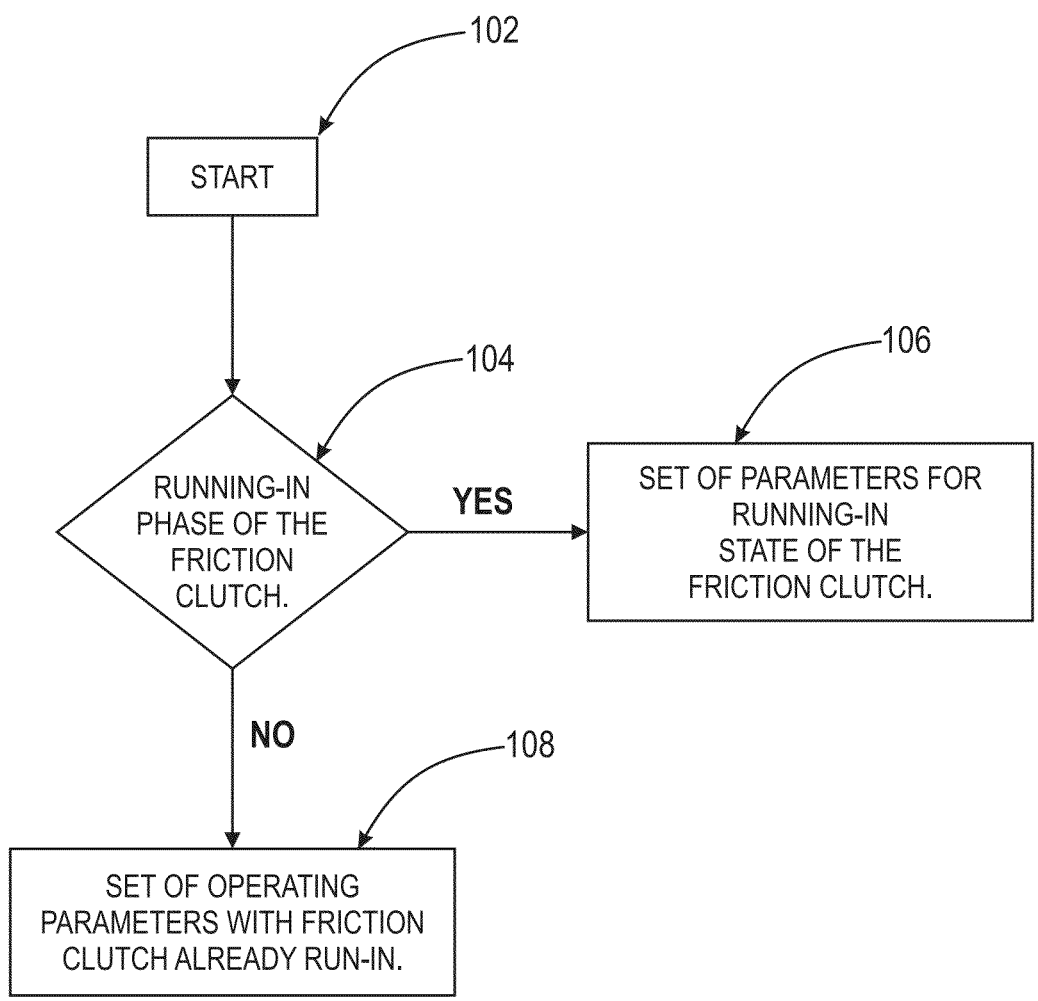

METHOD FOR CONTROLLING A FRICTION CLUTCH

CROSS-REFERENCE TO RELATED APPLICATIONS

This patent application is filed pursuant to 35 U.S.C. §120 and §365(c) as a continuation of International Patent Application PCT/DE2012/000137 filed Feb. 16, 2012 which application claims priority from German Patent Application No. 10 2011 013 939.7, filed Mar. 14, 2011, and German Patent Application No. 10 2011 015 639.9, filed Mar. 31, 2011, which applications are incorporated herein by reference to their entireties.

FIELD OF THE INVENTION

The invention relates to a method for controlling a friction clutch in a drivetrain of a motor vehicle by means of a clutch actuator, on the basis of a clutch model in which a nominal characteristic of the clutch torque, which is transmitted by the friction clutch, is adapted continuously to current operating parameters.

BACKGROUND OF THE INVENTION

Methods for controlling friction clutches are known from numerous serial applications in drivetrains of motor vehicles. For example, in drivetrains having a dual-clutch transmission, where in each case a friction clutch is situated between the crankshaft of a combustion engine and a transmission input shaft of a sub-drivetrain, and a shifting between two gears situated on the two sub-drivetrains occurs by means of an uninterrupted overlapping shift mechanism through overlapping disengagement of one friction clutch and engagement of the other, an especially exact control of the friction clutches is necessary in order to enable comfortable operation of the drivetrain.

BRIEF SUMMARY OF THE INVENTION

One or two clutch actuators are provided for the purpose of controlling the friction clutch(es). The clutch actuator controls the clutch torque to be transmitted via the friction clutch depending on operating parameters. For example, depending on the clutch torque to be transmitted, an actuating or actuator path, or a set point value which produces these, is specified from a clutch model. The clutch model depicts the real behavior of the friction clutch, where a nominal characteristic curve establishes a connection between the set point value and the clutch torque that is to be transmitted. This characteristic is adapted continuously, depending on the operating parameters of the friction clutch. For example, the clutch characteristic is relocated along the set point value by adapting a contact point at which the friction clutch begins to transmit torque. Through adaptation of a coefficient of friction, the frictional behavior of the friction clutch is modeled, for example, as a function of wear, hysteresis, and temperature. Furthermore, the shape of the nominal characteristic can be adapted to current properties of the friction clutch or to changing properties throughout the service life.

The realization of a set point value obtained from the clutch model is accomplished, for example, initially as a pre-control value, which is set unregulated in the clutch actuator, and subsequently, is regulated exactly by means of a position control. The set point value can then be followed by a slip regulation process, which sets the set point value while regulating a specified slip.

It has been found here that the nominal characteristic is of only limited help in the case of a clutch that has not yet been run-in and with specified comfort demands. For example, the torque transmission behavior of a so-called "green" friction clutch having friction linings in new condition changes greatly, a fact which can be attributed to unevenness of the friction linings, friction surfaces of the friction linings which are not yet adapted to each other, and the complementary friction surfaces of pressure plate and opposing pressure plate, setting effects of the lining resiliency and the like. Due to the great variability of the torque transmission behavior, there can be a loss of comfort at least some of the time when the nominal characteristic and its adaptation routines are used.

The object of the invention is therefore to propose a method for controlling a friction clutch, or two friction clutches provided in a dual-clutch transmission, which improves the driving comfort performance of a drivetrain over its entire service life.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1 is a flow chart showing control of a friction clutch during and after a run-in phase for the clutch.

DETAILED DESCRIPTION OF THE INVENTION

FIG. 1 is a flow chart showing control of a friction clutch during and after a run-in phase for the clutch. As further described below, the method starts with step 102. In step 104, a determination is made as to whether the clutch is in a run-in phase. If yes, step 106 is executed, if no, step 108 is executed. The object is fulfilled by a method for controlling a friction clutch in a drivetrain of a motor vehicle by means of a clutch actuator, on the basis of a clutch model in which a nominal characteristic curve of the clutch torque which is transmitted by the friction clutch is adapted continuously to current operating parameters, where the friction clutch is operated using different sets of operating parameters during a running-in phase and a post-running-in phase of the friction clutch. By this means, it is possible to provide a separate control of the friction clutch for each of the two operating states, namely a friction clutch in the running-in state and in the post-running-in state, which indeed provides a control of the friction clutch in each case on the basis of a clutch model using a nominal characteristic curve, but whose operating parameters are designed for the two states. The type of parameterizing and the realization of the set point values can be different in the different sets, with the provision of achieving greater driving comfort. For example, the nominal characteristic curve using a set of operating parameters adapted for general driving operation with the friction clutch already run in is retained, and the set of operating parameters in the running-in state of the friction clutch is adapted to this operating state.

In one embodiment, it is advantageous in this connection to change the temperature-dependence of the coefficient of friction, since the coefficient of friction for a friction clutch differs significantly from the temperature behavior of a friction clutch that has been run in. The temperature behavior of the coefficient of friction can be specified in the characteristic on the basis of empirically obtained data, as forms or in a similar manner. Furthermore, modified and adaptable operating parameters in the set for the running-in process can also be applied, for example, as the adaptation of a general change of the temperature, temperature gradients, friction, speed of rotation, slip speed and the like.

Since the running-in process runs continuously, it is advantageous to transform the set of the running-in state to the set of the post-running-in state of the friction clutch with increasing operation of the friction clutch. A measure of the transition from the running-in state to the post-running-in state can be provided, as a function of energy input into the friction clutch. For example, energy input into the friction clutch, such as frictional energy of 10 MJ, can be provided as the threshold for the transition from the running-in state to the post-running-in state. At the same time, the development of the operating parameter can be controlled, for example, by appropriate weighting of the adaptation results, independent of the energy input, so that at the threshold at the transition of the two sets to each other the adapted state of the operating parameters during the running-in phase corresponds essentially to the parameterizing of the operating parameters in the unchanged state of the post-running-in friction clutch, so that in effect a constant and flowing transition of the two states to each other can occur. The threshold of the transition can be set, definable by additional parameters. For example, the threshold can be dependent on the driving behavior of the driver over time, on the outside temperature integrated over the time period of the running-in state, the number of clutch processes, the number and intensity of the slip processes and/or the like.

Operating parameters of the friction clutch may be, for example, the coefficient of friction, a contact point, a shape of the characteristic and/or a clutch hysteresis of the friction clutch. In this case, the coefficient of friction and the contact point reflect the position of the characteristic in the field spanned by the clutch torque and the set point value. The shape of the characteristic curve reflects the behavior of the coefficient of friction, for example, non-linear, which furthermore can differ from the post-running-in state in the case of a friction clutch. The hysteresis reflects the direction-dependent behavior of the clutch torque when disengaging and engaging the friction clutch.

In one embodiment, a frequency of the adaptation of the operating parameters and/or an execution of an adaptation are undertaken differently in the two sets under specified operating conditions of the drivetrain. Due to the increased variability of the torque transmission behavior of the friction clutch in the running-in state, it is advantageous to increase the frequency of adaptation of the operating parameters. This can be achieved by changing the adaptation conditions which are usual in the post-running-in state. For example, the frequency of the adaptation can be increased by lowering the torque threshold of the combustion engine, by expanding a valid range for speeds of rotation, by detecting friction levels or adapting at less precise engine torques, for example, during a torque intervention in the combustion engine, during transition from idling to driving of the motor vehicle, during an onset of torque caused by a turbocharger and the like, in which case the reliability of these adaptations can be evaluated on their own.

When using special adaptation situations, for example, learning a contact point by means of torque ramps when standing still with a gear selected or the speed of rotation of the transmission input shaft with a non-active friction clutch in a dual-clutch transmission, the rate of repetition of the corresponding adaptation steps in the running-in state of the friction clutch can be increased.

Alternatively or in addition, an adaptation effective on at least one operating parameter can be carried out at different speeds in the two sets. For example, in addition to increasing the adaptation frequency, an additional increase in the speed of adaptation can be appropriate. This can be achieved directly, for example, by increasing the reinforcement of return to the adaptive parameters. In this case, through the use of minimum error bands an error or erroneous amount of an operating parameter found through adaptation can be adapted only partially, so that in total through a plurality of adaptation steps a possibly correct value of a prior adaptation is specified more slowly, and greatly fluctuating adaptation values are averaged. For example, in the stationary case of adaptation values that are not completely executed over the set point value, the corresponding torque errors at the friction clutch are in act greater, but in the dynamic case they are smaller due to their averaging function.

Alternatively or in addition, during the running-in phase at least one adapted operating parameter can be pre-controlled prior to regulation. For example, in an inactive friction clutch of a dual-clutch transmission, it can be beneficial to pre-control the adaptive parameters in addition to the existing compensations, above all if the friction clutch has been inactive already for an extended time and it can be assumed that the transmission behavior has changed. Since hard shifts/hard clutch engagement are regarded as more critical than easy excursions of the combustion engine, the slight increase in the coefficient of friction of the inactive friction clutch can be advantageous. Through the additionally occurring slippage or a slip phase prolonged thereby, the frequency of adaptation can also be increased.

In another embodiment, it is also advantageous if at least one operating parameter is adapted asymmetrically during the running-in phase in support of increased driving comfort. In this case, easy excursion of the combustion engine is advantageous to hard clutch engagement, and in this respect an asymmetrical adaptation of at least one operating parameter acting in this direction is advantageous. This can be achieved, for example, by using different reinforcements of return when adapting operating parameters, depending on arithmetic signs of the latter. For example, as a result of the asymmetrical adaptation of the coefficient of friction with the same torque error, it is possible to adapt upward more quickly than downward. It is also possible to provide different error thresholds for positive or negative torque errors at which an adaptation is carried out at all. For example, an adaptation of the coefficient of friction can occur when the torque error is greater than 10 Nm or smaller than −20 Nm.

Finally, alternatively or in addition, there can be provision in the control method to increase operating states with a slipping friction clutch during a running-in phase compared to the post-running-in phase. In the increase in the proportion of driving with slipping friction clutch, the frequency of adaptation can be increased automatically in this case. Due to the higher proportion of slippage itself, on the one hand the driving comfort increases in this case, and on the other hand, through the more frequent adaptation processes of the friction clutch its torque precision of the clutch torque is increased, which again results in an increase in the driving comfort.

What is claimed is:
1. A method for controlling a friction clutch in a drivetrain of a motor vehicle by means of a clutch actuator, comprising:
    transitioning from a running-in phase of the friction clutch to a post-running-in phase for the friction clutch based on a threshold, wherein the threshold is selected from a group consisting of energy input to the friction clutch, driving behavior of a driver, a number of clutch processes, and a number and intensity of slip processes for the friction clutch;
operating the friction clutch using:
a first set of operating parameters during the running-in phase; and,
a second set of operating parameters, different from the first set of operating parameters, during the post-running-in-phase of the friction clutch;
specifying from a clutch model, a clutch torque to be transmitted and at least one set point value which produces the clutch torque;
establishing a connection, with a nominal characteristic curve, between the set point value and the clutch torque;
transmitting the clutch torque by the friction clutch; and,
continuously adapting, using the clutch model, the nominal characteristic curve of the clutch torque:
according to the first set of operating parameters during the running-in phase; and,
according to the second set of operating parameters during the post-running-in phase.

2. The method as recited in claim 1, wherein the operating parameters of the friction clutch are a coefficient of friction, a contact point, a shape of the characteristic curve or a clutch hysteresis of the friction clutch.

3. The method as recited in claim 1, wherein the operating parameters of the friction clutch are a coefficient of friction, a contact point, a shape of the characteristic curve and a clutch hysteresis of the friction clutch.

4. The method as recited in claim 1, further comprising:
undertaking a frequency of the adaptation of the operating parameters or an execution of an adaptation differently in the first and second sets under specified operating conditions of the drivetrain.

5. The method as recited in claim 1, further comprising:
undertaking a frequency of the adaptation of the operating parameters and an execution of an adaptation differently in the first and second sets under specified operating conditions of the drivetrain.

6. The method as recited in claim 1, further comprising:
carrying out an adaptation effective on at least one operating parameter in the first and second sets at different speeds.

7. The method as recited in claim 1, further comprising:
pre-controlling, during the running-in phase, at least one adapted operating parameter prior to regulation.

8. The method as recited in claim 1, further comprising:
adapting asymmetrically, during the running-in phase, at least one operating parameter in support of increased driving comfort.

9. The method as recited in claim 1, further comprising:
increasing, during a running-in phase, operating states, with a slipping friction clutch, compared to the post-running-in phase.

10. The method of claim 1, wherein the at least one set point includes:
a first set point for the running-in phase; and,
a second set point, different from the first set point, for the post-running-in phase.

11. A method for controlling a friction clutch in a drivetrain of a motor vehicle by means of a clutch actuator, comprising:
operating the friction clutch using:
a first set of operating parameters during a running-in phase in which friction linings for the friction clutch are in a new condition or have not yet adapted to each other; and,
a second set of operating parameters, different from the first set of operating parameters, during a post-running-in phase of the friction clutch in which the friction linings for the friction clutch are not in the new condition or have adapted to each other;
specifying from a clutch model, a clutch torque to be transmitted and at least one set point value which produces the clutch torque;
establishing a connection, with a nominal characteristic curve, between the set point value and the clutch torque;
transmitting the clutch torque by the friction clutch; and,
continuously adapting, using the clutch model, the nominal characteristic curve of the clutch torque:
according to the first set of operating parameters during the running-in phase; and,
according to the second set of operating parameters during the post-running-in phase.

12. A method for controlling a friction clutch in a drivetrain of a motor vehicle by means of a clutch actuator, comprising:
operating the friction clutch using:
a first set of operating parameters during a running-in phase in which friction linings for the friction clutch are in a new condition or have not yet adapted to each other; and,
a second set of operating parameters, different from the first set of operating parameters, during a post-running-in phase of the friction clutch in which the friction linings for the friction clutch are not in the new condition or have adapted to each other;
specifying from a clutch model, a clutch torque to be transmitted and at least one set point value which produces the clutch torque;
establishing a connection, with a nominal characteristic curve, between the set point value and the clutch torque;
transmitting the clutch torque by the friction clutch; and,
continuously adapting, using the clutch model, the nominal characteristic curve of the clutch torque:
according to the first set of operating parameters during the running-in phase; and,
according to the second set of operating parameters during the post-running-in phase, wherein the at least one set of point value includes:
a first set point for the running-in phase; and,
a second set point, different from the first set point, for the post-running-in phase.

* * * * *